United States Patent
Breen et al.

[11] Patent Number: 6,030,204
[45] Date of Patent: Feb. 29, 2000

[54] METHOD FOR NO$_x$ REDUCTION BY UPPER FURNACE INJECTION OF SOLUTIONS OF FIXED NITROGEN IN WATER

[75] Inventors: Bernard P. Breen; Roger W. Glickert, both of Pittsburgh, Pa.; James E. Gabrielson, Hanover, Minn.; John P. Bionda, Coraopolis, Pa.; Anthony Hallo, Springdale, Pa.; Gerard F. Gretz, West Mifflin, Pa.

[73] Assignee: Duquesne Light Company, Pittsburgh, Pa.

[21] Appl. No.: 09/036,824

[22] Filed: Mar. 9, 1998

[51] Int. Cl.$^7$ .................................................. C01B 21/00
[52] U.S. Cl. .................................................................. 431/4
[58] Field of Search .................................. 110/212, 215, 110/235, 260, 345, 203, 261, 297; 422/172, 183; 423/235, 238, 245.3; 431/4

[56] References Cited

U.S. PATENT DOCUMENTS

| | | |
|---|---|---|
| 4,208,386 | 6/1980 | Arand et al. . |
| 4,779,545 | 10/1988 | Breen et al. . |
| 4,848,251 | 7/1989 | Breen et al. ............................ 110/347 |
| 4,992,249 | 2/1991 | Bowers .................................... 423/235 |
| 5,078,064 | 1/1992 | Breen et al. . |
| 5,141,726 | 8/1992 | Breen et al. . |
| 5,176,088 | 1/1993 | Amrhein et al. ......................... 110/345 |
| 5,181,475 | 1/1993 | Breen et al. . |
| 5,544,598 | 8/1996 | Breen et al. . |
| 5,746,144 | 5/1998 | Breen et al. ............................. 110/345 |
| 5,908,003 | 6/1999 | Hura et al. ............................... 110/345 |

OTHER PUBLICATIONS

"Gas Reburning and Gas Injection in Combination with SNCR in a Waste Incineration Plant," Bent Karill, International Gas Reburn Technology Workshop, Feb. 7–9, 1995, Malmo.

"Enhancing the Use of Coals by Gas Reburning–Sorbent Injection," submitted at the Energy and Environmental Research Corporation (EERC), First Industry Panel Meeting, Pittsburgh, PA, Mar. 15, 1988.

"GR–SI Process Design Studies for Hennepin Unit #1—Project Review," Energy and Environmental Research Corporation (EERC), submitted at the Project Review Meeting on Jun. 1516, 1988.

Reduction of Sulfur Trioxide and Nitrogen Oxides by Secondary Fuel Injection, Wendt et al., published at the Symposium of the Combustion Institute, 1972.

"Mitsubish 'MACT' In–Furnace NOx Removal Process for Stream Generator," Sakai et al., published at the U.S.–Japan NOx Information Exchange, Tokyo, Japan, May 25–30, 1981.

*Primary Examiner*—Wayne Langel
*Assistant Examiner*—Maribel Medina
*Attorney, Agent, or Firm*—Buchanan Ingersoll, P.C.

[57] ABSTRACT

In a method of reducing NO$_x$ a water-fixed nitrogen solution is injected into a furnace near the exit from the furnace where the temperatures exceed 2000° F. and combustion is occurring. Preferably the solution is injected through a combination of atomizing nozzles and spray jets into a region of the furnace which does not exceed 2700° F. A calcium compound to react with sulfur dioxide may also be added.

11 Claims, 3 Drawing Sheets

METHOD FOR NO$_x$ REDUCTION BY UPPER FURNACE INJECTION OF SOLUTIONS OF FIXED NITROGEN IN WATER

FIELD OF INVENTION

The invention relates to reducing NO$_x$ emissions from furnaces by the addition of a solution of fixed nitrogen compounds such as urea, ammonia, and ammonia salts in water into the furnace outside the primary combustion zone and yet in a zone where some fuel elements are burning. The reaction to reduce the NO$_x$ is increased by adding fuel with the solution, or by the combustion of the base fuel persisting into the zone where the solution is added.

BACKGROUND OF THE INVENTION

During combustion of fuels with fixed nitrogen such as coal, oxygen from the air may combine with the nitrogen to produce nitrogen oxides (NO$_x$). At sufficiently high temperatures, oxygen reacts directly with atmospheric nitrogen to form NO$_x$. Emission of nitrogen oxide is regarded as undesirable because the presence of nitrogen oxide in a furnace flue gas (along with sulfur oxides) causes the condensed gases to become corrosive and acidic. There are numerous government regulations which limit the amount of nitrogen oxide which may be emitted from a combustion furnace. Titles I and IV of the Clean Air Act, as amended in 1990 ("The Clean Air Act"), require significant NO$_x$ reduction from large power plants. Title I of the Clean Air Act focuses on the problems of ozone non-attainment. Ozone is formed as a result of photochemical reactions between nitrogen oxides emitted from central power generating stations, vehicles and other stationary sources, and volatile organic compounds. Ozone is harmful to human health. Consequently, in many urban areas the Title I NO$_x$ controls are more stringent than the Title IV limits. Thus, there is a need for apparatus and processes which reduce the nitrogen oxide emissions in furnace flue gas.

Commercially available techniques to reduce the nitrogen oxide emissions in a furnace flue gas are low NO$_x$ burners, overfire air, selective non-catalytic NO$_x$ reduction (SNCR), selective catalytic reduction (SCR), and reburning. Currently, retrofitting boilers with low NO$_x$ burners and overfire air is the most economic route to comply with Title IV requirements of the Clean Air Act. However, low NO$_x$ burners cannot reduce NO$_x$ emissions to levels required by Title I of the Clean Air Act. As a consequence, electric utilities are faced with the option of adding SNCR or reburning to the boiler. In addition, cyclone boilers cannot be retrofitted with low NO$_x$ burners. SNCR and reburning are the two options for cyclone boilers.

SNCR is very much limited to temperatures of 1750° F. plus or minus about 50° F. The addition of hydrogen to ammonia can allow the operation at temperatures which are somewhat lower. However, the excess use of ammonia or urea, especially at low temperatures, can cause ammonia to be discharged in the flue gas. This ammonia emission is undesirable in itself and the ammonia, at low temperatures, can react with chlorine, which is present in small amounts in almost all solid fuels and most residual oils, to form a fine fume which will either block back-end heat exchangers and/or cause a visible emission which is often in violation of regulations. At higher temperatures the nitrogen compounds will fail to reduce the NO$_x$ emissions and sometimes will be oxidized to NO and increase the emissions.

The reburning process is also known as in-furnace nitrogen oxide reduction or fuel staging. The standard reburning process has been described in several patents and publications. See for example, "Enhancing the Use of Coals by Gas Reburning-Sorbent Injection," submitted at the Energy and Environmental Research Corporation (EERC), First Industry Panel Meeting, Pittsburgh, Pa., Mar. 15, 1988; "GR-SI Process Design Studies for Hennepin Unit #1—Project Review," Energy and Environmental Research Corporation (EERC), submitted at the Project Review Meeting on Jun. 15–16, 1988; "Reduction of Sulfur Trioxide and Nitrogen Oxides by Secondary Fuel Injection," Wendt, et al.; published at the Symposium of the Combustion Institute, 1972; "Mitsubish 'MACT' In-Furnace NO$_x$ Removal Process for Steam Generator," Sakai, et al.; published at the U.S.-Japan NO$_x$ Information Exchange, Tokyo, Japan, May 25–30, 1981. In reburning, a fraction of the total thermal input is injected above the primary flame zone in the form of a hydrocarbon fuel such as coal, oil, or gas. A reburn zone stoichiometry of 0.90 (10% excess fuel) is considered optimum for NO$_x$ control. Thus, the amount of reburn fuel required is a direct function of the primary zone excess air. Under typical boiler conditions a reburn fuel input in the range of 15% to 25% is sufficient to form a fuel-rich reburn zone. The reburn fuel is injected at high temperatures in order to promote reactions under the overall fuel rich stoichiometry. Typical flue gas temperatures at the injection location are above 2600° F. Completion air is added above the fuel-rich reburn zone in order to burn off the unburnt hydrocarbons and carbon monoxide (CO). In addition to the above specifications, the prior art on standard reburn teaches that rapid and complete dispersion of the reburn fuel in flue gas is beneficial. Thus, flue gas recirculation (FGR) has been used to promote mixing in all standard reburn demonstrations. Standard reburn technology requires a tall furnace to set up a fuel-rich zone followed by a lean zone. Many furnaces do not have the volumes required for retrofitting this technology.

In current practice of the reburning process, usually more than enough fuel is added to react with all of the oxygen remaining in the original combustion products. A reducing zone, or a zone with an excess of fuel is formed. In this reducing zone the NO reacts with the excess fuel to form N$_2$, NH$_3$, HCN, and other reduced nitrogen. Then, more air is added to combust the remainder of the reburn fuel. At this point the NH$_3$, HCN, and other reduced forms are oxidized to N$_2$ and NO. At this step and throughout the mixing process, there is also a direct reaction between NO and NH$_3$ to form N$_2$. In each step, part of the fixed nitrogen (originally NO) was converted to N$_2$. This is the goal of the reburn process.

Sometimes NO$_x$ reduction process is used in which the upper furnace fuel is not added in sufficient quantities to consume all of the oxygen remaining in the gas after the initial combustion. In such a process it is necessary that large volumes become reducing while parallel volumes remain oxidizing. In the reducing volumes N$_2$, NH$_3$, and HCN are formed. Then the reducing and oxidizing gases mix together and the remainder of the fuel is consumed. At this point the reduced nitrogen species are oxidized to N$_2$ and NO. Again there is direct reduction to N$_2$ by the reaction between NH$_3$ and NO.

The process which is sometimes called controlled mixing/upper furnace fuel injection usually requires natural gas as the upper furnace fuel. Natural gas is expensive. Adequate penetration and mixing is sometimes difficult to achieve. Utility boiler furnaces have horizontal dimensions of 50 feet and greater. Often it is necessary to use a carrier gas to assure adequate penetration of the natural gas into the furnace. The carrier gas may be steam, air, or recycled combustion products. If steam is used as the carrier media, this can add considerable expense to the process. If the upper furnace natural gas is 5% of the fuel and the fuel is only 10% of the air flow, upper furnace injected natural gas is perhaps only 0.5% of the gas flow. The combustion products being quite hot may have a volume as high as 1000 times the upper furnace natural gas. The use of air or recycled combustion products requires expensive duct work. Often there is no place for the duct work. The boiler face is simply too crowded with necessary equipment to allow the duct work to be installed. Large penetrations through the furnace walls are needed and this requires bending water wall tubes. The flue gas needs to be returned from a remote part of the boiler. Fans are needed for flue gas and often for air. Because air has oxygen in it, use of air as the carrier gas requires more upper furnace fuel before the gas stream can be made reducing.

Some operators have tried coal as a reburn fuel. The burnout times for coal are longer than for natural gas. This requires that both the fuel and the burnout air be added sooner. As a result, much of the reaction occurs at higher temperatures which results in more $NO_x$ emissions. The use of coal requires that there be additional pipes to carry primary air and pulverized fuel from the mills, usually at ground level, to the height where the reburn fuel is injected. It may even require an additional pulverizer.

Reburn processes may all be dependent on the equilibrium between NO, $O_2$, and $N_2$ at the furnace exit temperature. If the process continues beyond the furnace exit into the convective pass, there are excessive amounts of CO and/or unburned carbon. This limit on reburn of any type may render those processes unsuitable for the next generation of $NO_x$ control.

In our copending U.S. patent application, Ser. No. 08/657,322, filed Jun. 3, 1996, now U.S. Pat. No. 5,746,144 we have disclosed a process where the reburning fuel is a coal water slurry. No burn-out air was visualized so it was an upper furnace fuel injection process. Further, we envisioned placing the coal water slurry where the $NO_x$ is the most concentrated, so it is a controlled fuel injection process. In that application we also disclosed dissolving urea in the slurry water to increase the $NO_x$ reduction. This increased reduction was by way of adding a fixed nitrogen which would be protected in the hot furnace from oxidation by the water which would lower the temperature immediately surrounding the gas until the water had evaporated, and by the coal which would consume the oxygen which first arrived after the water was evaporated. This urea was used to improve the action of the slurry.

Others have also proposed injecting urea into flue gas to reduce $NO_x$. Arand in U.S. Pat. No. 4,208,386 teaches that urea can be injected with methanol. But, he says that the injection should be done in regions of the furnace where the temperature does not exceed 2000° F., but is within the range 1300° to 2000° F. This reflects the belief of those skilled in the art that injection of nitrogen containing compounds into furnace regions where the temperature is greater than 2000° F. will generate $NO_x$.

While there are various effective methods of reducing $NO_x$ emissions, there is a clear need for an improvement which is inexpensive and effective.

SUMMARY OF THE INVENTION

We provide a method of reducing $NO_x$ by injecting a water-fixed nitrogen solution into a furnace near the exit from the furnace. The solution is injected into a region of the furnace where the temperature is greater than 2000° F., but does not exceed 2700° F. The fixed nitrogen will be reduced nitrogen such as urea, ammonia, and ammonium salts. Furthermore, the solution must be injected into a region of the furnace where the combustion is not complete, nor arrested by excessively low temperatures. We have found that if combustion is occurring in the region then the injected nitrogen will reduce $NO_x$. This is contrary to the teaching of the prior art that injecting ammonia or other nitrogen containing compounds into furnace regions where temperatures exceed 2000° F. will generate $NO_x$.

We also prefer to add sufficient water in the solution to drive the reaction between water and carbon monoxide to the products, that is, to the hydrogen and carbon dioxide.

We also prefer to add a calcium compound to the solution. The calcium reacts with the sulfur dioxide to form calcium sulfate and thus reduce the emissions of sulfur dioxide.

We further prefer to introduce our solution into the furnace through a combination of atomizing nozzles and jets.

We may also suspend fuel, such as pulverized or micronized coal, in the solution in order to increase the amount of unburned carbon and/or CO available to assist in the reaction between NO and the reduced nitrogen species.

We may detune the boiler or operate it in a manner to intentionally increase the CO and/or unburned carbon in the zones where we add the solution.

Other objects and advantages of the invention will become apparent from a description of certain preferred embodiments described with reference to the figures.

DESCRIPTION OF THE PREFERRED EMBODIMENTS

Figure 1:
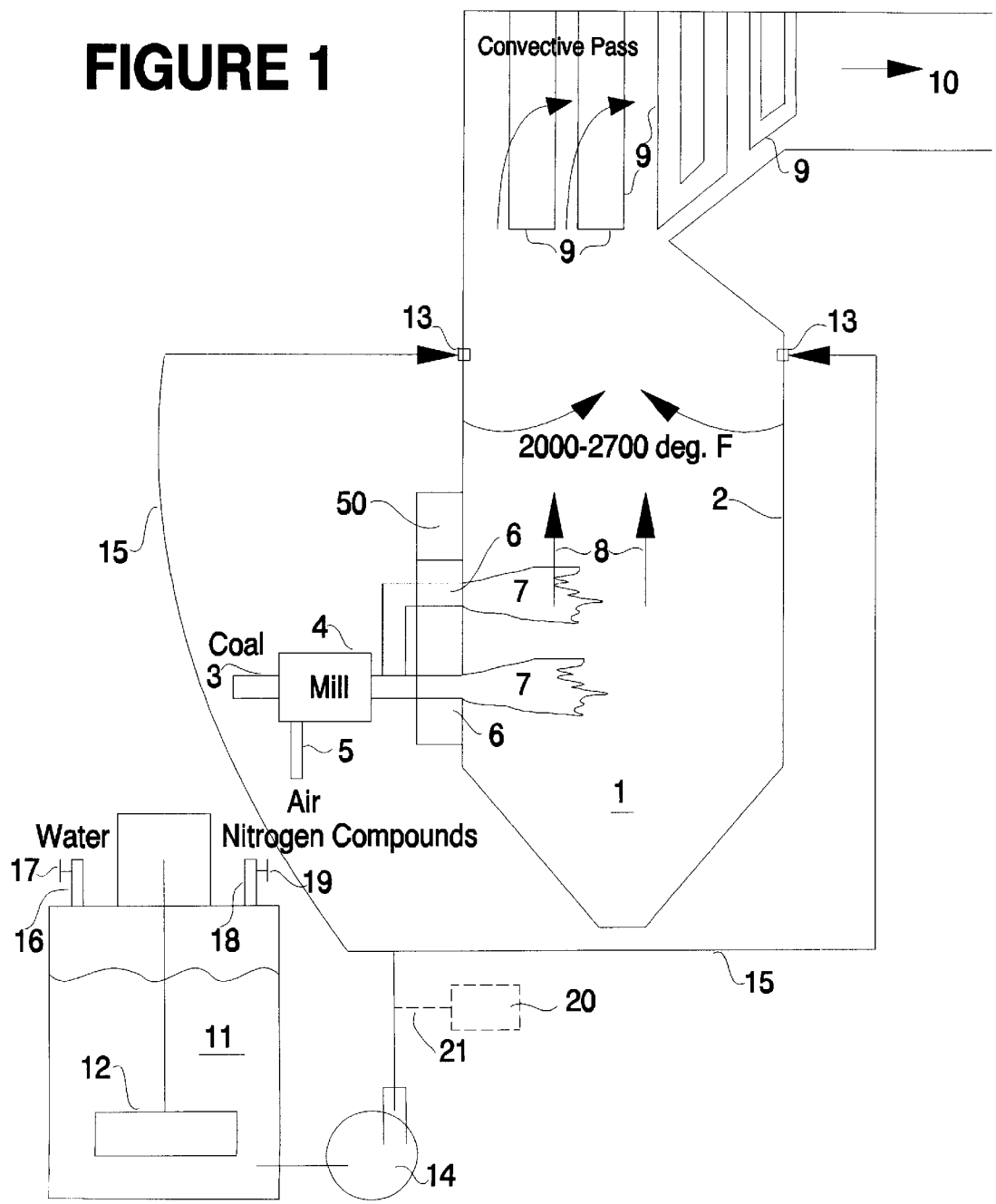
FIG. 1 is a diagram of a furnace in which a solution of one or more nitrogen compounds in water is being injected in accordance with the present invention.

Coal or other fuel, usually a solid fuel, is burned in a furnace or a boiler. The coal is pulverized to about 60% to 80% through a 200 mesh screen. It is conveyed to the furnace in about 15% to 25% of the combustion air. It then flows through burners that also introduce most or all of the balance of the combustion air, usually with an excess in air of 10% to 35%. At times, for partial control of $NO_x$ emissions, some of the combustion air is introduced through alternate openings such as overfire air ports. After issuing from the burners, the coal burns and releases heat, much of which may be absorbed into water flowing in tubes which form the enclosure of the furnace.

Coal usually contains about one percent fixed nitrogen. During the combustion process 15% to 35% of this fixed nitrogen is converted to NO. In addition, a very small fraction of the nitrogen in the combustion air is converted to NO. Our process is designed to convert much of this NO to the harmless $N_2$.

The combustion of the coal in the furnace is often not complete due to a number of factors which include: furnace retention time of the combustion reactants and products is not long enough, insufficient excess air is used, the coal does not have enough volatiles or is not free burning, the pulverization of the coal is inadequate, the air and coal is not mixed properly, too much heat is transferred to the walls of the furnace, too much overfire air or misplaced overfire air is used, reburn processes introduce fuel components which are not completely burned in the furnace, or low $NO_x$ burners delay the combustion to such an extent that it is not complete at the furnace exit. This results in unburned carbon and/or carbon monoxide (CO) in the gases exiting the furnace.

To reduce the NO, we inject a solution of at least one reduced nitrogen source in water into the furnace above the top row of burners where the temperature exceeds 2000° F. but is not greater than 2700° F. In many coal fired furnaces coal and CO will be present in this region and combustion will be occurring. If this is not happening then our method should not be used because the nitrogen compound will form $NO_x$ rather than reduce $NO_x$.

We prefer that the injection occur in a region of the furnace where the flue gas contains 20% to 50% combustibles in solids.

The solution may contain urea, ammonia, ammonium chloride, ammonium sulfate, ammonium bisulfate, ammonium chloride, ammonium phosphate, ammonium sulfite, or any combination of these nitrogen containing materials. The urea may be agricultural grade or animal feed grade. The solution preferably contains dissolved nitrogen compounds in amounts such that there are 0.25 to 5.0 atoms of dissolved nitrogen for each atom of nitrogen as $NO_x$ in the flue gas.

We design our process to allow the reduced nitrogen to react with the NO in the combustion products and to be assisted in this by the CO, unburned carbon and oxygen in the flue gas. (We place the solution so the CO, which is present near the end of the combustion will react with water from the solution and from combustion to form $CO_2$ and $H_2$.) The $H_2$ burns more easily at the falling temperatures near the furnace exit and it facilitates the reaction between reduced nitrogen species and NO to form $N_2$ and thus reduce the $NO_x$ emissions. The $H_2$ enhances the NO-destroying reactions whether the reduced nitrogen comes from ammonia, urea or other compounds, or from reactions between the CO and previously formed NO. At the same time, the reduced nitrogen water solution is introduced so the NO-destroying reactions will occur at the lowest possible temperature in the furnace allowing for the lowest emissions.

The $H_2$ opens up the temperature window of the NO-destroying reactions and in particular extends the window to lower temperatures. It is fortunate that this is true, since the equilibrium between CO with $H_2O$ and $CO_2$ with $H_2$ favors the $H_2$ side at lower temperature, for this reaction:

$$CO+H_2O=CO_2+H_2$$

With half as much $H_2O$ as $CO_2$, which would be typical of our process, especially near the solution stream, the equilibrium ratios at the temperatures shown are as follows.

| Temperature, °F. | CO | $H_2$ |
|---|---|---|
| 2420 | 1 | 0.158 |
| 2000 | 1 | 0.223 |
| 1700 | 1 | 0.35 |
| 1520 | 1 | 0.5 |

From this, it can be seen that at the lower temperatures where it is necessary to reduce the NO, the $H_2$ concentration will be increased and the $H_2$ will be assisting the reaction.

Overall, the added water is only a fraction of the water produced by the oxidation of the hydrogen in the fuel. However, the local water vapor surrounding the urea is much more concentrated. This water can react as follows:

$$O+H_2O=2OH$$

This reaction removes the O atoms which react with $NH_3$, $NH_2$ and NH to form NO, and they defeat the purpose of adding the reduced nitrogen compound. The O atoms are more concentrated at higher temperatures. The addition of water is said to improve the $NO_x$ reduction at higher temperature (Richard Lyon, "Kinetics and Mechanism of Thermal $DeNO_x$: A Review." Presented at the ACS meeting August–September 1987, New Orleans, La.).

We have now seen that the water can open the temperature window of the desired reactions by raising the upper limit and lowering the lower limit.

Our nitrogen compound water solution can be injected into a wide variety of furnaces for $NO_x$ reduction. The furnace could be a boiler, a process heater, an incinerator, or a type of furnace which directly or indirectly supplies hot gases to heat materials in process. The furnace could be burning many different fuels including coal, coke, rubber waste, wood or wood waste, oil or various gases. Solid fuels could be pulverized and burned, burned on a grate, or burned in cyclones. The furnace 1 shown in FIG. 1 is designed to burn pulverized coal which passes from a supply pipe 3 into mill 4. The coal is milled and combined with air from primary air supply 5 and directed to burners 6. At the burners the coal is ignited, forming flames 7 in the primary combustion zone. In the primary combustion zone the temperature is typically above 3,000° F. In the furnace shown here, some of the combustion air is introduced through overfire air ports 50 which causes the primary flame zones 7 to be fuel-rich and reduces the $NO_x$ emissions. Combustion products flow from the primary combustion zone in the direction of arrows 8 to heat exchangers 9 in the upper convection zone of the furnace. The flue gas is directed through the conduit 10 to an economizer and other energy recovery devices and then to an exhaust stack (not shown). At some distance above the primary combustion zone, there is a region where the flue gas is in the range of 2,000° F. to 2,700° F. At that region we prefer to provide injectors 13 in furnace wall 2. Even with the low $NO_x$ operation provided with the overfire air system, our fixed nitrogen water solution improvement reduces the $NO_x$ even further. The lower the solution is introduced, the more penetration will be possible and necessary. If the solution is put in just before the convection pass, it will be necessary to have both good atomization and maximum penetration which are mutually exclusive. Lower injection or multiple elevation injection with some of the injection as jets is preferred. We provide a tank 11 containing a mixer 12. Solution is drawn from the tank by a pump 14 through the pipes 15 to injectors 13. Valves 17 and 19 on the water supply 16 and on the nitrogen supply pipe 18 enable us to adjust the nitrogen water ratio in the solution. An optional supply 20 is connected to the solution pipe 15. Through this supply we can introduce lime, limestone, powdered coal or a coal water slurry into the nitrogen water solution.

As the gases progress through the convective passes of a boiler, the temperatures drop very rapidly from about 2000° F. to about 700° F. That is, they fall very rapidly through the temperature window where the reduced fixed nitrogen reacts with the nitrogen oxides. Normally this temperature window is only about 100 degrees. We increase the window to 400 degrees by increasing $H_2O$.

The water in the solution improves the kinetics of the oxidation of CO which allows the process to operate at lower temperatures. The ratio of water to fixed nitrogen can be changed to modify the very local temperatures in the upper furnace where the fixed nitrogen supplied in the solution begins to react with NO from combustion. If the temperature is a bit too high for the lowest $NO_x$, for $CaCO_3$ calcination, or for effective use of urea, more water can be added. Nitrogen/water ratio changes can be made for final temperature trim and to adjust the location of the reaction between NO and the supplied nitrogen.

The upper furnace location of the injection and the cooling of the local gases by the presence of the water provides a low temperature environment which is conducive to burning limestone to lime in a manner that causes the lime to be reactive. Limestone ($CaCO_3$) is sometimes injected directly into furnaces where it is calcined to lime (CaO), which subsequently reacts with the sulfur dioxide ($SO_2$) and oxygen in the gas to form calcium sulfate ($CaSO_4$) and thus the $SO_2$ emissions are reduced. Temperatures of 2000° F. to 2400° F. are needed to calcine limestone in the short time available in the furnace. Yet, temperatures as low as 2600° F. can dead burn the lime. When the lime is dead burned, it has less surface area and it only poorly reacts with the $SO_2$. Thus, by adding limestone to our solution where we control the temperature, we are able to effectively calcine the limestone without dead burning the resulting lime. Therefore, we produce a reactive product. This reactive lime is in the correct place to remove the $SO_2$ from the flue gas. We prefer to add lime or limestone in a quantity to provide 0.25 to 3.0 atoms of calcium per atom of sulfur in all of the fuels supplied to the furnace.

Figure 2:
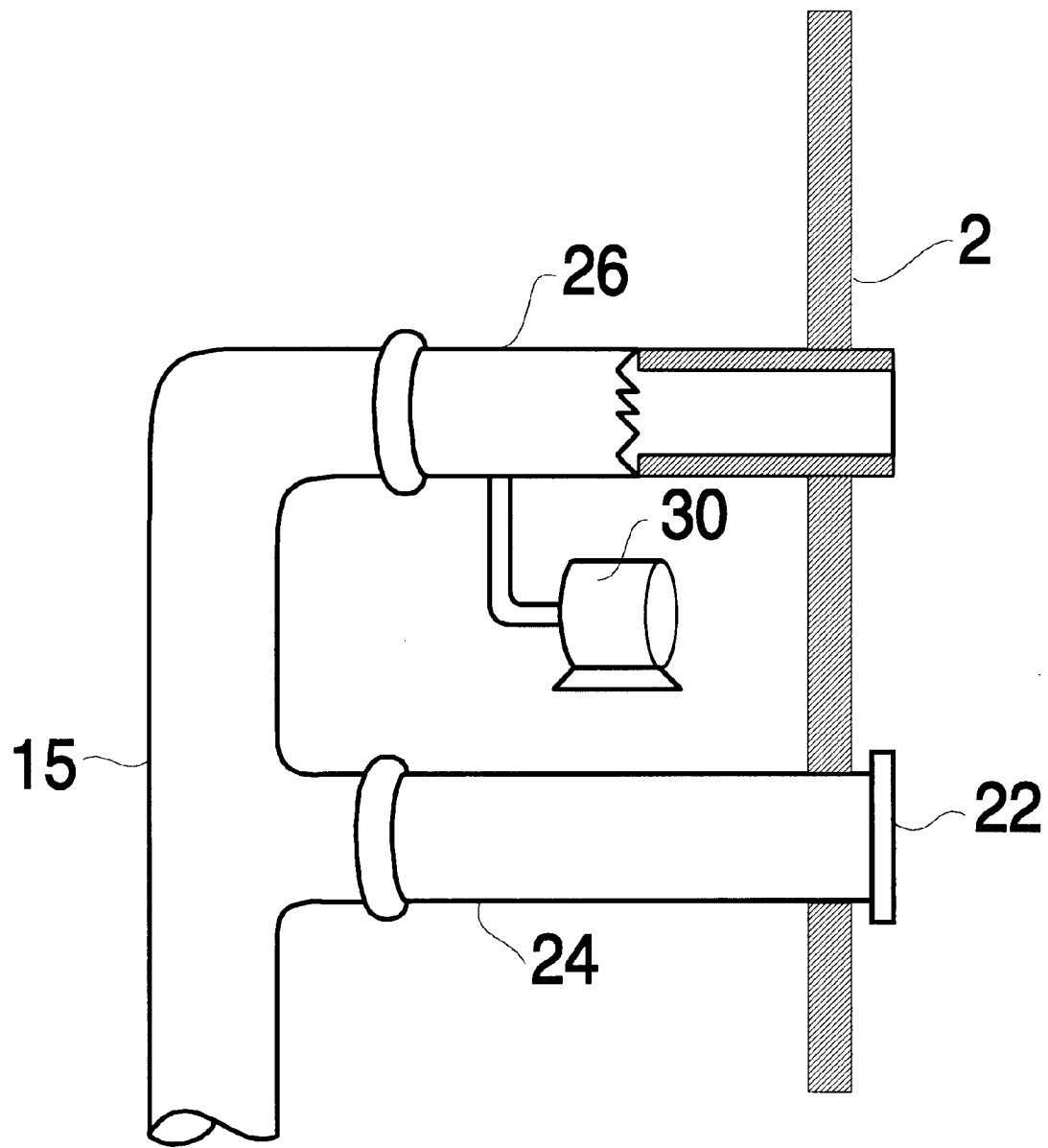
FIG. 2 is a side view partially in section of a present preferred injector combination for injecting the solutions.

As shown in FIG. 2, we prefer to introduce the solution through atomizing nozzles 22 which can handle the slurry and through open jets 26 which introduce a continuous stream for maximum penetration. Each nozzle is connected to injector pipe 24. Although only one atomizing nozzle and one jet are shown in FIG. 2, several such pairs are positioned around the furnace. Different size jets and atomized drops can be used depending upon the requirements of the specific furnace. A pump 30 connected to at least some of the injectors for injecting additional water, air or nitrogen into the solution helps us to control the velocity of the solution stream and resulting penetration. The pump can also be used to change and thus control the water solute ratio of the solution being injected. We wish to cover the total furnace area with nitrogen water solution. By providing several jets that can be independently controlled we can change the temperature and distribution of nitrogen compounds within the furnace.

Figure 3:
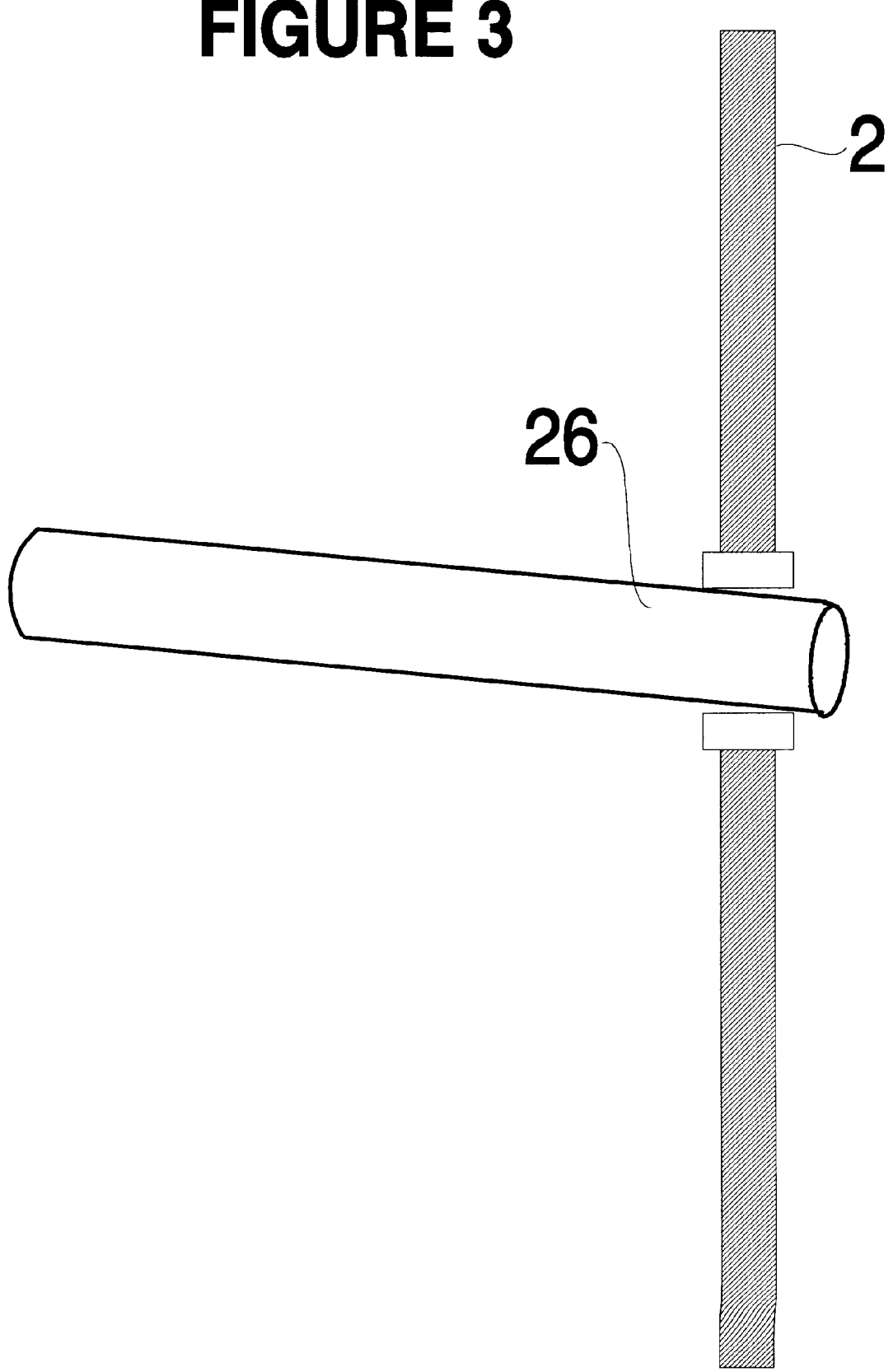
FIG. 3 is a side view of an adjustable injector for injecting the solutions.

As shown in FIG. 2, we prefer to provide a coupling 15 for at least some of the injector pipes 24 and 26 which allows us to change the direction of the flow of the solution into the furnace. FIG. 3 shows how the coupling can be used to permit the operator to adjust the injectors 26 to assure that the entire chosen region of the furnace receives the solution.

Gas from cyclone furnaces can be treated in the furnace after the gas has exited the cyclones.

While the $NO_x$ which is removed from flue gas by reburn is often seen as the reduction of NO to $N_2$ by fuel or the reaction of $NH_3$ or HCN to $N_2$ by partial oxidation, some of the removal is the result of NO reacting with $NH_3$ or HCN to form $N_2$. The $NH_3$ or HCN usually is formed from NO by reduction by fuel. The reaction eliminates two fixed nitrogen atoms. This is very useful. Sometimes a reduced nitrogen will be added to react with NO. This is the case in the well known selective noncatalytic reduction of $NO_x$ (SNCR) which ammonia ($NH_3$) or urea is injected in the gas at about 1800° F. The reagent reacts with the NO to form $N_2$. In some cases, ammonia is added with natural gas to amplify the $NO_x$ reduction of a controlled mixing upper furnace fuel injection process. The SNCR process whether using ammonia or urea often results in ammonia slip.

To overcome this problem, we introduce our urea and/or ammonia water solution at a higher temperature. Urea or ammonia in the solution acts as a selective reducing agent to reduce NO. The temperature is high enough that we need not worry about slip. The $NH_3$ or urea that does not react with the NO will be decomposed. At the same time, the CO and unburned carbon inherently in the gas due to incomplete combustion, brought about by intentionally lowering the combustion efficiency of the burners, or caused by the introduction of fuel near the solution nozzles will help keep the decomposing $NH_3$ or urea from forming NO. Both urea and ammonia as well as many ammonium salts are readily soluble in water and can easily be made into a strong solution and introduced into the furnace in amounts beyond the stoichiometric ratio with the NO. The excess will form $N_2$ at these temperatures, which are above the optimum SNCR temperature.

The water in the solution will increase the acid dewpoint of the flue gas and cause more $SO_3$ to condense on the fly ash as sulfuric acid. The result will be a better performing electrostatic precipitator.

Our temperature window is greater than 2000° F. to about 2700° F. The solution is from 30% to 99% water, and adjustments can be made to accommodate different furnaces or furnace conditions. The solution is introduced in each injector both as a stream (jet) and a spray of drops, usually in combination to assure better coverage. The fluid flow can be pulsed or continuous.

EXAMPLE 1

This example is given by way of comparison. A roof fired boiler, which supplies steam at 950° F. and 1250 psi. to a turbine was operated so the combination produced 100 MW. This loading is near the maximum for the unit. The roof fired boiler was operated with overfire air and an improved burner design, both of which were intended to produce low $NO_x$ operation. The emissions measured in the B side of a divided furnace having an A side and a B side were 0.48 lb. $NO_x$ as $NO_2/10^6$ Btu. The flyash from the boiler had about 40% carbon in it. This emission level is only about two-thirds of the emission level of the unit without the overfire air and improved burner.

EXAMPLE 2

The same unit as above, using the same overfire air and improved burners was again operated at 100 MW. This time, a urea in water solution was injected into the B side of the furnace at an elevation where the combustion products had cooled to a temperature of about 1800° F. The urea dissolved in the water was agricultural grade urea. The urea was added in the amount of 0.5 moles of urea to 1.0 moles of $NO_x$ on the B side. The emissions from the B side were 0.32 lb. $NO_x$ as $NO_2/10^6$ Btu.

Although we have described certain present preferred embodiments of our method and apparatus, it should be distinctly understood that our invention is not limited thereto, but may be variously embodied within the scope of the following claims.

We claim:

1. An in-furnace method of reducing nitrogen oxides in the flue gas comprising the step of injecting a solution into a region of a furnace where temperatures exceed 2000° F. and combustion is occurring, the solution containing at least one nitrogen containing compound in water, so that the at least one nitrogen containing compound and water mixes with nitrogen oxides in the furnace, the solution being injected in sufficient quantity to promote a reaction between said nitrogen oxide in the flue gas and said at least one nitrogen containing compound in the solution, so as to substantially reduce nitrogen oxide content of the flue gas.

2. The method of claim 1 wherein the solution is injected into flue gas having a temperature which does not exceed 2700° F.

3. The method of claim 1, also comprising adding limestone to the solution.

4. The method of claim 3 wherein the limestone is added in a quantity to provide 0.25 to 3.0 atoms of calcium per atom of sulfur in all fuels supplied to the furnace.

5. The method of claim 1 also comprising adding lime to the solution.

6. The method of claim 5 wherein the lime is added in a quantity to provide 0.20 to 2.5 atoms of calcium per atom of sulfur in all of the fuels.

7. The method of claim 1 also comprising changing a ratio of water to dissolved nitrogen in the solution in order to trim reaction temperature and chemistry.

8. The method of claim 1 also comprising adding pulverized coal or a coal water slurry to the solution.

9. The method of claim 8 wherein the coal is added in a quantity to provide 1.0 to 10 percent of the total fuel to the furnace.

10. The method of claim 1 also comprising changing a ratio of water to solute during injection of the solution to trim upper furnace reaction temperature and to adjust concentrations of the reactants.

11. The method of claim 1 also comprising changing the primary combustion in the furnace so as to increase the at least one of fly ash, carbon and CO in the flue gas.

* * * * *